US007996218B2

(12) United States Patent
Kim et al.

(10) Patent No.: US 7,996,218 B2
(45) Date of Patent: Aug. 9, 2011

(54) USER ADAPTIVE SPEECH RECOGNITION METHOD AND APPARATUS

(75) Inventors: Jung-eun Kim, Suwon-si (KR); Jeong-su Kim, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1516 days.

(21) Appl. No.: 11/354,942

(22) Filed: Feb. 16, 2006

(65) Prior Publication Data

US 2006/0200347 A1    Sep. 7, 2006

(30) Foreign Application Priority Data

Mar. 7, 2005    (KR) .................. 10-2005-0018786

(51) Int. Cl.
*G10L 15/00*    (2006.01)
(52) U.S. Cl. .................. 704/236; 704/231
(58) Field of Classification Search ........... 704/231–257
See application file for complete search history.

(56) References Cited

U.S. PATENT DOCUMENTS

| | | | |
|---|---|---|---|
| 5,305,244 A * | 4/1994 | Newman et al. ............ 708/141 |
| 5,559,925 A * | 9/1996 | Austin ........................ 704/231 |
| 5,732,187 A | 3/1998 | Scruggs et al. ............. 395/2.6 |
| 6,567,778 B1 | 5/2003 | Chang et al. ................ 704/257 |
| 2003/0125945 A1 * | 7/2003 | Doyle ......................... 704/246 |
| 2005/0080627 A1 * | 4/2005 | Hennebert et al. ......... 704/270 |
| 2006/0085184 A1 * | 4/2006 | Marcus ....................... 704/234 |

FOREIGN PATENT DOCUMENTS

| | | |
|---|---|---|
| JP | 2000-181482 | 6/2000 |
| JP | 2004-325635 | 11/2004 |
| KR | 100277105 | 10/2000 |

* cited by examiner

*Primary Examiner* — David R Hudspeth
*Assistant Examiner* — Samuel G Neway
(74) *Attorney, Agent, or Firm* — Staas & Halsey LLP (57) ABSTRACT

A user adaptive speech recognition method and apparatus is disclosed that controls user confirmation of a recognition candidate using a new threshold value adapted to a user. The user adaptive speech recognition method includes calculating a confidence score of a recognition candidate according to the result of speech recognition, setting a new threshold value adapted to the user based on a result of user confirmation of the recognition candidate and the confidence score of the recognition candidate, and outputting a corresponding recognition candidate as a result of the speech recognition if the calculated confidence score is higher than the new threshold value. Thus, the need for user confirmation of the result of speech recognition is reduced and the probability of speech recognition success is increased.

21 Claims, 9 Drawing Sheets

USER ADAPTIVE SPEECH RECOGNITION METHOD AND APPARATUS

CROSS-REFERENCE TO RELATED APPLICATION

This application claims priority from Korean Patent Application No. 10-2005-0018786 filed on Mar. 7, 2005 in the Korean Intellectual Property Office, the disclosure of which is incorporated herein by reference.

BACKGROUND OF THE INVENTION

1. Field of the Invention

The present invention relates to a method and apparatus for speech recognition, and more particularly, to a user adaptive speech recognition method and apparatus that controls user confirmation of a recognition candidate using a new threshold value adapted to a user.

2. Description of Related Art

Speech recognition is a process that extracts features from an input speech, and after applying a pattern recognition algorithm, estimates whether a phoneme or word sequence is from a speaker.

In appliances that have a speech recognition function, such as a cellular phone, PDA, automobile navigation system, a user can input a control command through speech.

For example, when using an automobile navigation system that has a speech recognition function, a user can get destination information simply by speaking the destination address instead of pressing search buttons.

However, due to the features of speech there is a limitation to the recognition success rate. Accordingly, a conventional speech recognition technique first performs recognition for an input speech, and provides recognition candidates for the user to confirm the success of the recognition.

For example, if the speech recognition apparatus recognizes "Seoul Station" from the input speech, the speech recognition apparatus asks the user "Is Seoul Station Correct?" The user confirms the success or failure of the recognition by answering "Yes" or "No."

If the answer is positive, the speech recognition apparatus decides the recognition has succeeded, and sends the corresponding recognition candidate as the result of recognition to an application unit.

However, the conventional technique causes a user inconvenience because every recognition result requires a confirmation process.

U.S. Pat. No. 6,567,778 entitled "Natural Language Speech Recognition Using Slot Semantic Confidence Scores Related to Their Word Recognition Confidence Scores" describes a technology that calculates confidence scores for an input speech and if the confidence score is over the threshold value, it outputs a corresponding recognition candidate as the result of recognition without a user confirmation process.

However, in U.S. Pat. No. 6,567,778, because every user has different speech features, and if a uniform threshold value is applied to every user, the frequency of user confirmations may not be reduced. Thus, the user still needs to perform a confirmation process for most recognition candidates.

Therefore, a technique is required that can increase the success rate of the speech recognition while decreasing the frequency of user confirmations.

BRIEF SUMMARY

Accordingly, the present invention has been made to solve the above-mentioned problems occurring in the prior art and an aspect of the present invention reduces the frequency of user confirmation and to increase the success rate of speech recognition with user adaptive new threshold value.

According to an aspect of the present invention, there is provided a user adaptive speech recognition method, according to an exemplary embodiment of the present invention, which includes calculating a confidence score of a recognition candidate according to the result of speech recognition input from a user, setting a new threshold value adapted to the user through the result of user confirmation of the recognition candidate and the confidence score of the recognition candidate, and outputting the corresponding recognition candidate as the result of the speech recognition if the calculated confidence score is higher than the new threshold value.

According to another aspect of the present invention, there is provided a user adaptive speech recognition apparatus which includes a confidence score calculation unit calculating a confidence score of a recognition candidate according to the result of speech recognition input from a user, a threshold value setup unit setting a new threshold value adapted to the user through the result of user confirmation of the recognition candidate and the confidence score of the recognition candidate, and a control unit outputting the corresponding recognition candidate as the result of the speech recognition if the calculated confidence score is higher than the new threshold value.

According to another aspect of the present invention, there is provided a computer-readable recording medium encoded with processing instructions for causing a processor to execute a user adaptive speech recognition method, the method including: calculating a confidence score of a recognition candidate according to a result of speech recognition of speech input from a user; setting a new threshold value adapted to the user based on a result of user confirmation of the recognition candidate and the confidence score of the recognition candidate; and outputting a corresponding recognition candidate as the result of the speech recognition when the calculated confidence score is higher than the new threshold value.

According to another aspect of the present invention, there is provided a method of setting a new threshold value for controlling user confirmation of a recognition candidate in speech recognition, the method comprising: determining whether a recognition candidate presented to the user is indicated by the user as correct; classifying the recognition candidate based on a result of the determining, the recognition candidate being classified in a first group when the recognition candidate is correct, the recognition candidate being a classified in a second group when the recognition candidate is incorrect; determining whether a range of probabilities of validity of the recognition candidates of the first group and a range of probabilities of validity of the recognition candidates of the second group overlap; calculating the new threshold value in a range between the range of the probabilities of validity of the recognition candidates of the first group and the range of the probabilities of validity of the recognition candidates of the second group, when the range of the first group and the range of the second group do not overlap; and calculating the new threshold value in a range where the range of the probabilities of validity of the recognition candidates of the first group and the range of the probabilities of validity of the recognition candidates of the second groups overlap, when the range of the first group and the range of the second group overlap.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
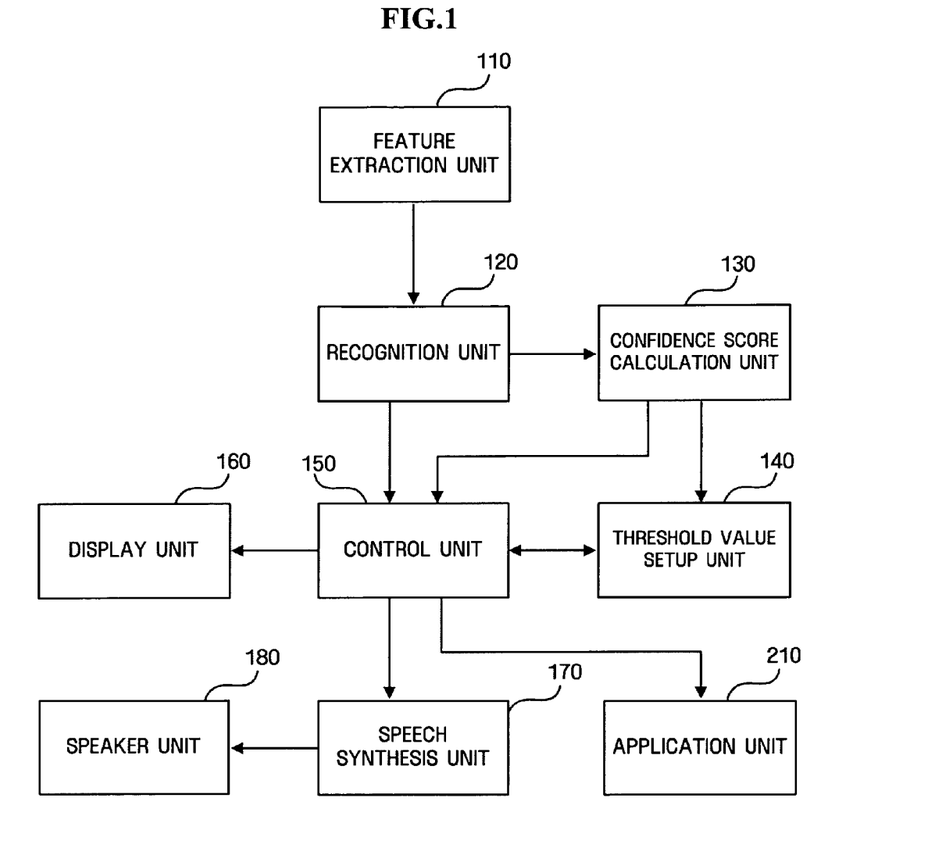
FIG. 1 is a block diagram illustrating the construction of a user adaptive speech recognition apparatus according to an exemplary embodiment of the present invention.

FIG. 1 is a block diagram illustrating the construction of a user adaptive speech recognition apparatus according to an exemplary embodiment of the present invention.

The speech recognition apparatus includes a feature extraction unit 110, a recognition unit 120, a confidence score calculation unit 130, a threshold value setup unit 140, and a control unit 150. Also, the speech recognition apparatus includes a display unit 160, a speech synthesis unit 170 and a speaker unit 180.

The feature extraction unit 110 extracts features of a speech input from a user. The feature extraction is to extract components that are useful for speech recognition from the input speech, and is generally related to a process of information compression and dimension reduction. For speech recognition, the features of an LPC (Linear Predictive Coding) cepstrum, a PLP (Perceptual Linear Prediction) cepstrum, an MFCC (Mel Frequency Cepstral Coefficient), a differential cepstrum, filter bank energy, and differential energy may be used.

The recognition unit 120 performs a recognition process on the user input speech, and outputs possible recognition candidates as the result of speech recognition process. For example, the recognition unit 120 uses a given speech model, and searches for the recognizable words using the features extracted by the feature extraction unit 110 in order to output recognition candidates.

The units of a sound model for speech recognition may be a phoneme, a diphone, a triphone, a quinphone, a syllable, and a word. For example, a speech model may be information on a character, a unit of phoneme and the feature of each phoneme. The speech model may be based on the hidden Markov model (hereinafter referred to as "HMM") in the present embodiment.

The recognition unit 120 can further refer to a pronunciation model and language model to recognize input speech.

The pronunciation model may be a simple pronunciation model that assigns a single pronunciation per word using a representative pronunciation that is defined as a standard pronunciation, a multiple pronunciation model that considers allowable pronunciations, dialect, and accent, a statistical pronunciation model that considers the probability of each pronunciation, and a lexical pronunciation model that is based on the phoneme.

The language model means a grammar used for continuous speech recognition. An example of the grammar that defines the language model is a structural language such as an FSN (Finite State Network) and a CFG (Context-Free Grammar), and a statistical grammar such as n-gram. The n-gram is the grammar that defines the probability of a next word predicted from the last n–1 words, and this type of grammar includes bi-gram, tri-gram and 4-gram.

Therefore, in an exemplary embodiment, the recognition unit 120 may output not only the individual words but also the recognition candidates of a sentence constituted through the user input speech.

The confidence score calculation unit 130 calculates the confidence score of a recognition candidate that is outputted from the recognition unit 120. In the present embodiment, the confidence score is the probability of validity; that is, the probability that the recognition candidate is a correct result. For example, the confidence score may be the relative value of the probability when other speech besides a phoneme or words that are recognition candidates are spoken.

For example, a phone model and anti-phone model may be used to calculate the confidence score. The phone model is an HMM that is generated by training phonemes extracted from real speech. The anti-phone model is an HMM that is generated by training a cohort set that is a set of phonemes similar to real speech phonemes.

In calculating the confidence score using the phone model and anti-phone model, the confidence score calculation unit 130 searches for the most similar phoneme that is extracted by the feature extraction unit 110 in the phone model, and calculates the confidence score of the searched phoneme in the anti-phone model. Then, the confidence score calculation unit 130 can calculate the confidence score by calculating the difference in the confidence scores between the phone model and anti-phone model, and applying the difference to a specified function.

The threshold value setup unit 140 sets the threshold value (hereinafter referred to as "new threshold value") that is adapted to the user who is using the speech recognition apparatus through the confirmation result and confidence score of each recognition candidate. The threshold setup unit 140 will be described in detail with reference to the FIGS. 2 to 5b.

The control unit 150 decides whether to receive a confirmation from the user with respect to the recognition candidate outputted from the recognition unit 120 according to the new set threshold value.

If the new threshold value is not set, the control unit 150 provides the recognition candidate outputted from the recognition unit 120 to the user and receives the user's confirmation with respect to the recognition candidate. In this case, if the user confirms that the recognition candidate is correct, the control unit 160 outputs the corresponding recognition candidate as the result of speech recognition.

On the other hand, if the new threshold value is set, the control unit 150 compares the confidence score of the recognition candidate outputted from the recognition unit 120 with the new threshold value.

If the confidence score is higher than the threshold value, the control unit 150 outputs the recognition candidate as the result of speech recognition. In this case, the control unit 150 may output the recognition candidate as the result of speech recognition even without receiving the user's confirmation.

However, if the confidence score is lower than the new threshold value, the control unit 150 provides the recognition candidate to the user, and receives a confirmation with respect to the recognition candidate from the user. This process may be performed in the same manner as the case where the new threshold value is not set.

The recognition result outputted from the control unit 150 is transferred to an application unit 210 to provide a specified service. For example, if the speech recognition apparatus is used in an automobile navigation system, the recognition result may be transferred to an application unit that provides a map searching service.

Figure 2:
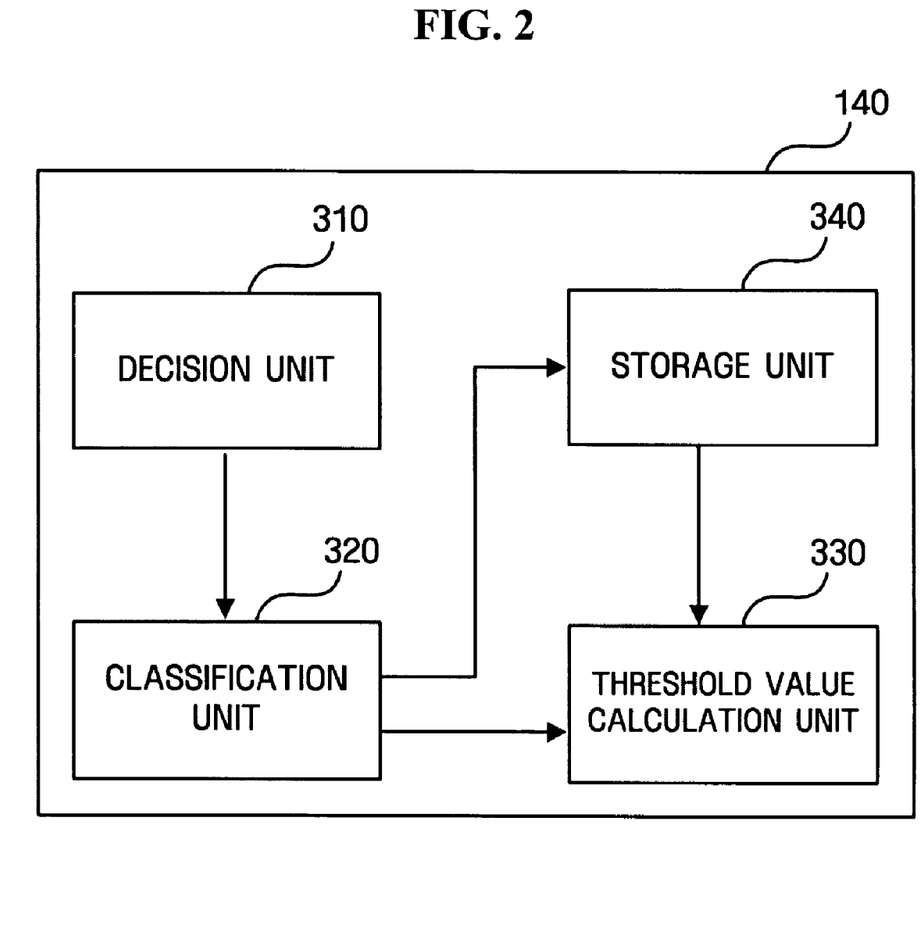
FIG. 2 is a block diagram illustrating the detailed construction of a threshold value setup unit according to an exemplary embodiment of the present invention.

FIG. 2 is a block diagram illustrating the detailed construction of a threshold value setup unit according to an exemplary embodiment of the present invention.

The threshold value setup unit 140 includes a decision unit 310, a classification unit 320, a threshold value calculation unit 330 and a storage unit 340.

Figure 3:
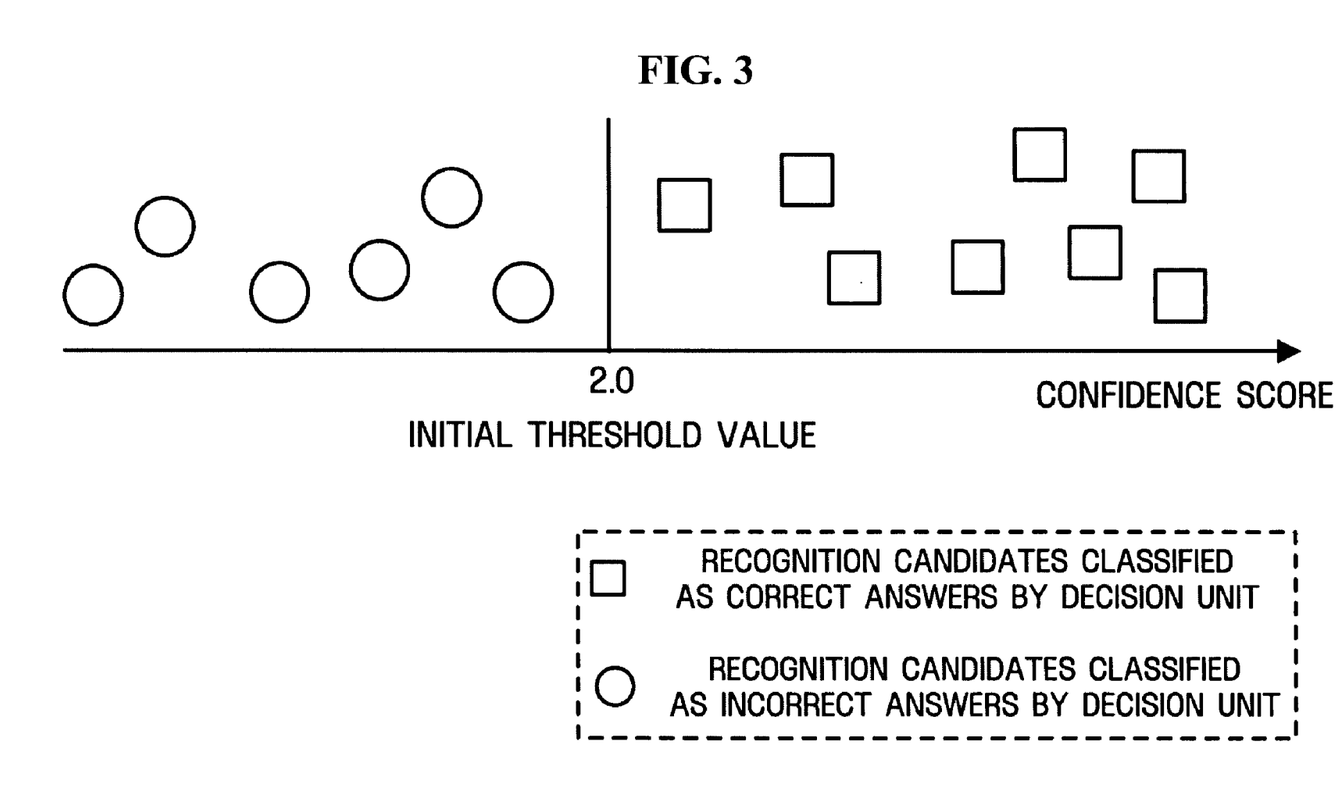
FIG. 3 is a view illustrating the distribution of success and fail of the recognition candidates decided by a decision unit according to an exemplary embodiment of the present invention.

The decision unit 310 compares the confidence score of recognition candidates with an initial threshold value, and classifies the recognition candidates into correct answers and incorrect answers. That is, a recognition candidate, whose confidence score is higher than the initial threshold value, is classified as a correct answer, which is a success of the user input speech recognition; and a recognition candidate whose confidence score is lower than the initial threshold value is classified as an incorrect answer, which is a failure of the user input speech recognition. The initial threshold value may be set in advance according to the feature of the application that uses the result of speech recognition. An example of a confidence score distribution of recognition candidates classified by the decision unit 310 is illustrated in FIG. 3. In FIG. 3, the initial threshold value is set to 2.0.

The classification unit 320 classifies the recognition candidates that are correct answers as a first group, and the recognition candidates that are incorrect answers as a second group. Therefore, an incorrect answer that is classified as a correct answer (hereinafter referred to as "false acceptance") by the decision unit 310 may be included in the first group, and a correct answer that is classified as an incorrect answer but that is in fact correct (hereinafter referred to as "false reject") may be included in the second group.

Figure 4A:
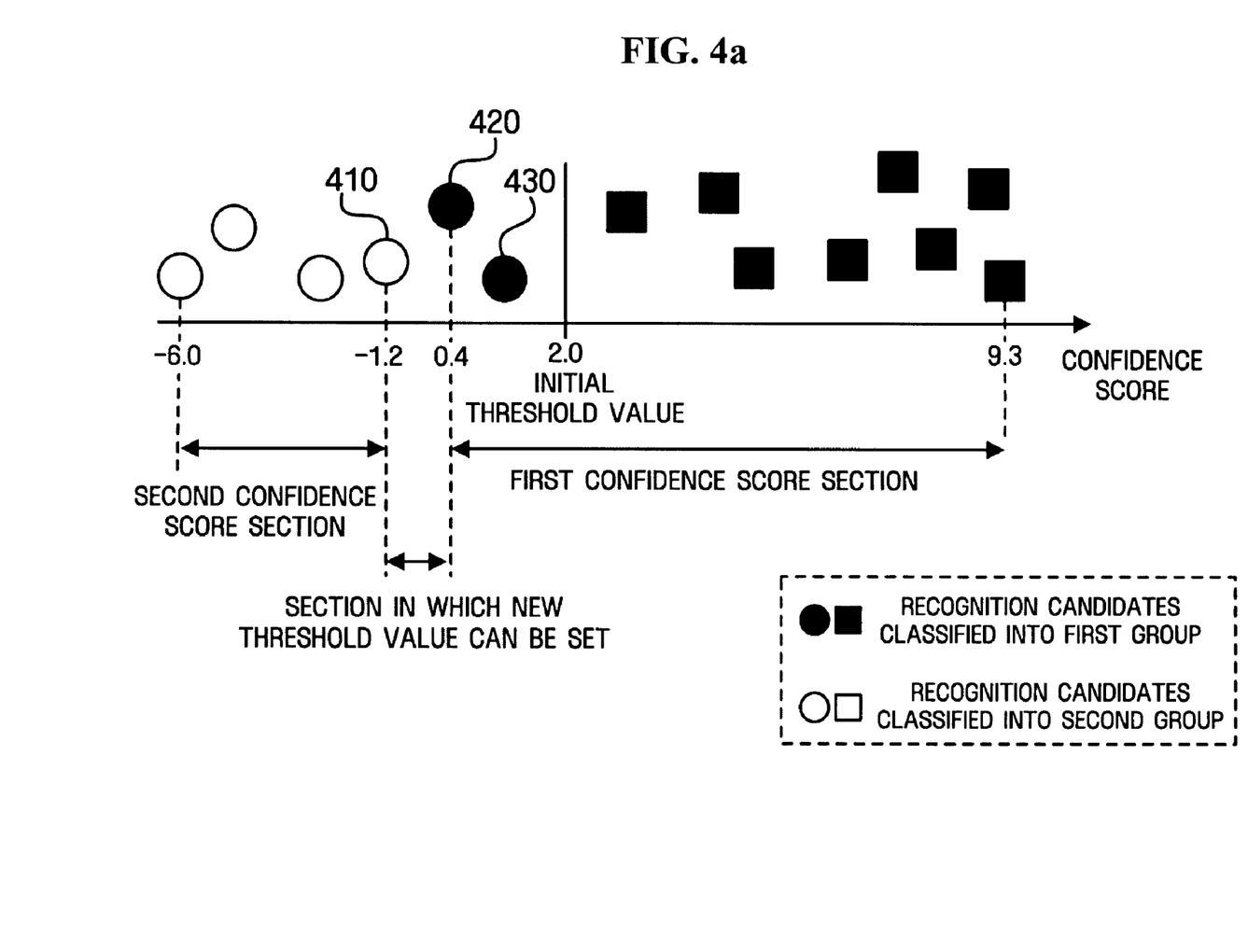
FIG. 4a is a view illustrating the distribution of the recognition candidates classified by a classification unit according to an exemplary embodiment of the present invention.
Figure 4B:
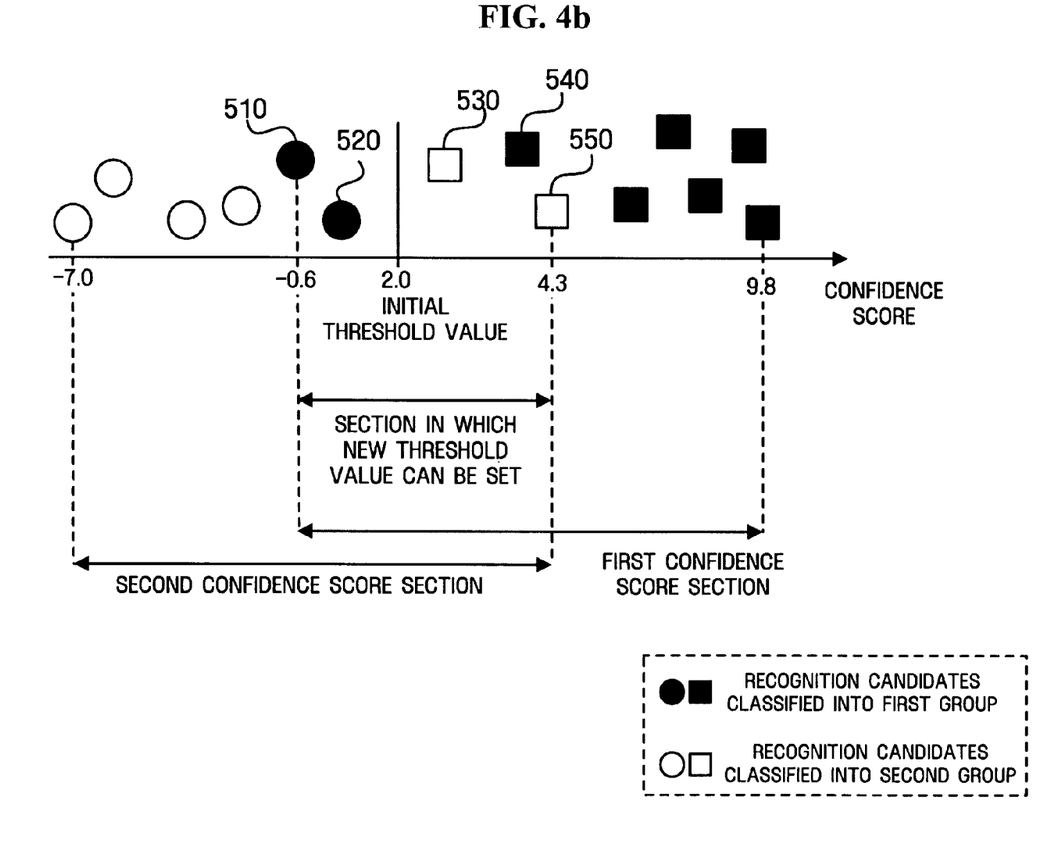
FIG. 4b is a view illustrating the distribution of the recognition candidates classified by a classification unit according to another exemplary embodiment of the present invention.

The distribution of the recognition candidates classified by the classification unit 320 according to an exemplary embodiment is illustrated in FIGS. 4a and 4b. In these figures, numerals on the horizontal coordinate axis indicate the confidence scores of respective recognition candidates. In the exemplary embodiment of FIG. 4a, the recognition candidates 420 and 430 are false rejects. In the exemplary embodiment of FIG. 4b, the recognition candidates 510 and 520 are false rejects, and the recognition candidates 530 and 550 are false acceptances.

The confidence scores and the recognition candidates classified by the classification unit 320 are stored in the storage unit 340. Also, the results of the user's confirmation of the recognition candidates may be transferred from the control unit 150 to the storage unit 340.

The threshold value calculation unit 330 calculates the new threshold value adapted to the user according to the result of recognition candidate classification by the classification unit 320 and the confidence score of the recognition candidate. The new threshold value calculation by the threshold value calculation unit 330 may be performed if the total number of speech inputs is larger than the predetermined threshold number of speech inputs. The threshold number that is used for the threshold value calculation varies with the feature of the application. For example, the threshold number can be set to higher for an application that requires more accurate recognition.

If a section in which the confidence scores of the recognition candidates classified into the first group (hereinafter referred to as the "first confidence score section"), and the section in which the confidence scores of the recognition candidates classified to the second group (hereinafter referred to as the "second confidence score section") do not overlap each other, the threshold value calculation unit 330 calculates a new value that is on the boundary of the first and the second confidence score sections.

More specifically, the new threshold value calculated by the threshold value calculation unit 330 is lower than the lowest confidence score of the first group, and it is higher than the highest confidence score of the second group. For example, if the recognition candidates are distributed as shown in FIG. 4a, the new threshold value can be calculated to have a value between the confidence score of the recognition candidate 410 and the confidence score of the recognition candidate 420.

The threshold value calculation unit 330 may calculate the threshold value using the average of the lowest confidence score of the first group and the highest confidence score of the second group. For example of FIG. 4a, the new threshold value can be the average of the confidence score of the recognition candidates 410 and 420.

On the other hand, if the first and second confidence score sections overlap each other, another exemplary embodiment is required to calculate the new threshold value.

If the first and second confidence score sections are not clearly divided and overlap each other as illustrated in FIG. 4b due to the incompleteness of a confidence score calculation algorithm, the threshold value calculation unit 330 can calculate a new value that is in the overlapped section.

Specifically, the new threshold value calculated by the threshold value calculation unit 330 is higher than the lowest confidence score of the recognition candidate classified into the first group, and is lower than the highest confidence score of the recognition candidate classified into the second group. For example, when the recognition candidates are distributed as illustrated in FIG. 4b, the new threshold value can be calculated so that it has a value between the confidence scores of the recognition candidates 510 and 550.

The new threshold value may be set so as to decrease the number of false acceptances and the number of false rejects. However, when the new threshold value is raised, the number of false rejects is increased, and when as the new threshold value is lowered, the number of false acceptances is increased.

Therefore, if the decision unit 310 re-analyzes the correct and incorrect answers of the recognition candidates stored in the storage unit 340 on the basis of the new threshold value, the threshold value calculation unit 340 calculates the new threshold value whereby the ratio of the false acceptances to the false rejects becomes a threshold ratio. That is, the threshold value calculation unit 330 calculates the new threshold value so that the ratio of the number of the recognition candidates having the confidence scores below the new threshold value among the recognition candidates classified into the first group to the number of the recognition candidates having the confidence scores above the new threshold value among the recognition candidates classified into the second group becomes the threshold ratio.

There may be a plurality of values that satisfy the above-described condition. For example, one of the values included in the section between the confidence scores of the recognition candidate 510 and the recognition candidate 550 may be set as the new threshold value in the exemplary embodiment of FIG. 5a (to be described later).

Accordingly, the new threshold value may be within a specified confidence score range. This confidence score range is set so that the ratio of the number of the recognition candidates having the confidence scores below a lower threshold value of the confidence score range among the recognition candidates classified into the first group to the number of the recognition candidates having the confidence scores above an upper threshold value of the confidence score range among the recognition candidates classified into the second group becomes the same as the threshold ratio.

More specifically, the new threshold value may be an average value of the lowest confidence score of a recognition candidate that is higher than the upper threshold value of the confidence score range that satisfies the above-described condition and the highest confidence score of a recognition candidate that is lower than the lower threshold value of the confidence score range. For example, the new threshold value may be the average of the confidence scores of the recognition candidates 510 and 520 in the exemplary embodiment of FIG. 5a to be described later.

On the other hand, since the false acceptance and false reject may influence the application performance differently depending on an application that will use the result of speech recognition, the threshold ratio may be set according to the features of the secondary application.

For example, if it is more important to decrease the number of false rejects rather than the number of false acceptances, the threshold ratio may be set as the ratio of false rejects that is lower than that of false acceptances. That is, if it is required that the ratio of false rejects be 20% of the total number of false acceptances and false rejects, the threshold ratio may be set so that the ratio of the false acceptances to the false rejects is 4:1.

Figure 5A:
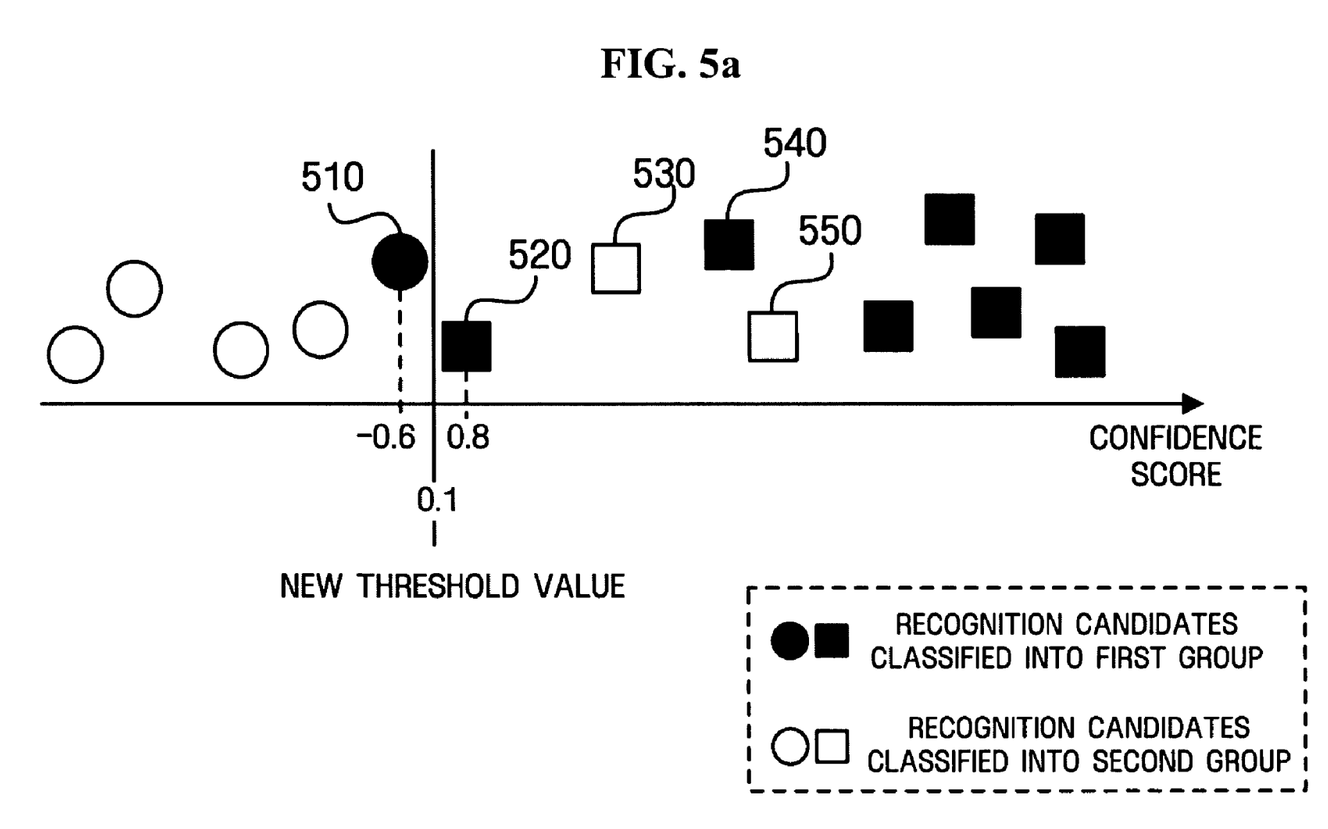
FIG. 5a is a view illustrating the distribution of the recognition candidates classified on the basis of a new threshold value according to an exemplary embodiment of the present invention.

If the threshold ratio is set so that the ratio of the false acceptances to the false rejects is 2:1 in the classified recognition candidates illustrated in FIG. 4b, the new threshold value calculated by the threshold value calculation unit 330 may be a value between the confidence scores of the recognition candidates 510 and 520. In this case, if the decision unit 310 classifies the correct and incorrect answers based on the new threshold value, the recognition candidate 520 can be classified as the correct answer. As a result, the ratio of the false acceptances (e.g., recognition candidates 530 and 550) to the false rejects (e.g., recognition candidate 510) becomes 2:1 as illustrated in FIG. 5a.

Figure 5B:
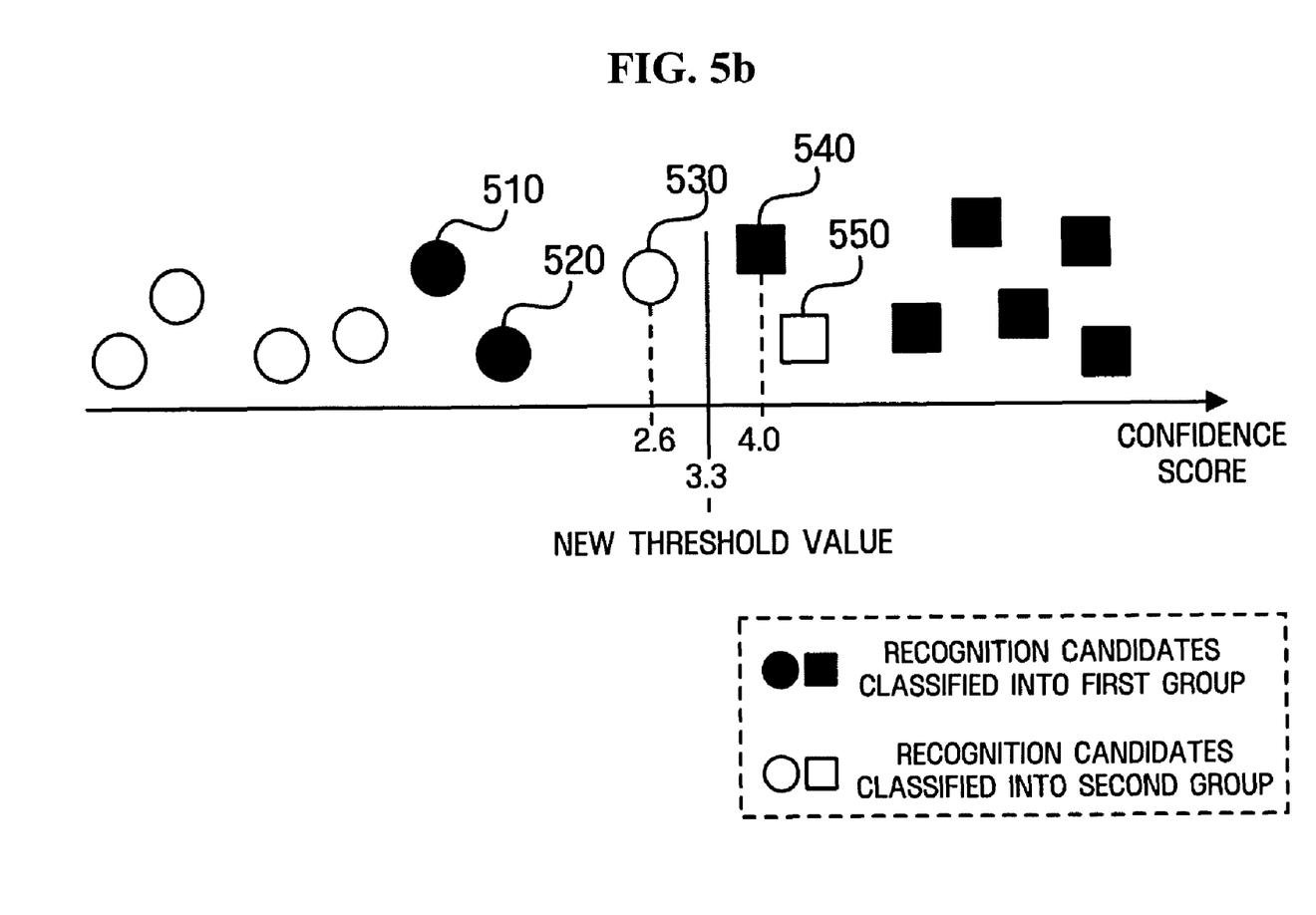
FIG. 5b is a view illustrating the distribution of the recognition candidates classified on the basis of a new threshold value according to another exemplary embodiment of the present invention.

On the other hand, if the threshold ratio is set so that the ratio of the false acceptances to the false rejects is 1:2 in the classified recognition candidates as illustrated in FIG. 4b, the new threshold value calculated by the threshold value calculation unit 330 may be a value between the confidence scores of the recognition candidates 530 and 540. In this case, if the decision unit 310 classifies the correct and incorrect answers based on the new threshold value, the recognition candidate 530 can be classified as an incorrect answer. As a result, the ratio of false acceptances (e.g., recognition candidate 550) to false rejects (e.g., recognition candidates 510 and 520) becomes 1:2 as illustrated in FIG. 5b.

As described above, if the new threshold value adapted to the user is set using the confidence scores of recognition candidates based on sufficient speech inputs corresponding to the threshold number, the ratio of the false acceptances to the false rejects remains the statistical threshold ratio.

Hereinafter, the operation of the user adaptive speech recognition apparatus according to an exemplary embodiment of the present invention will be described with reference to FIGS. 6 and 7.

Figure 6:
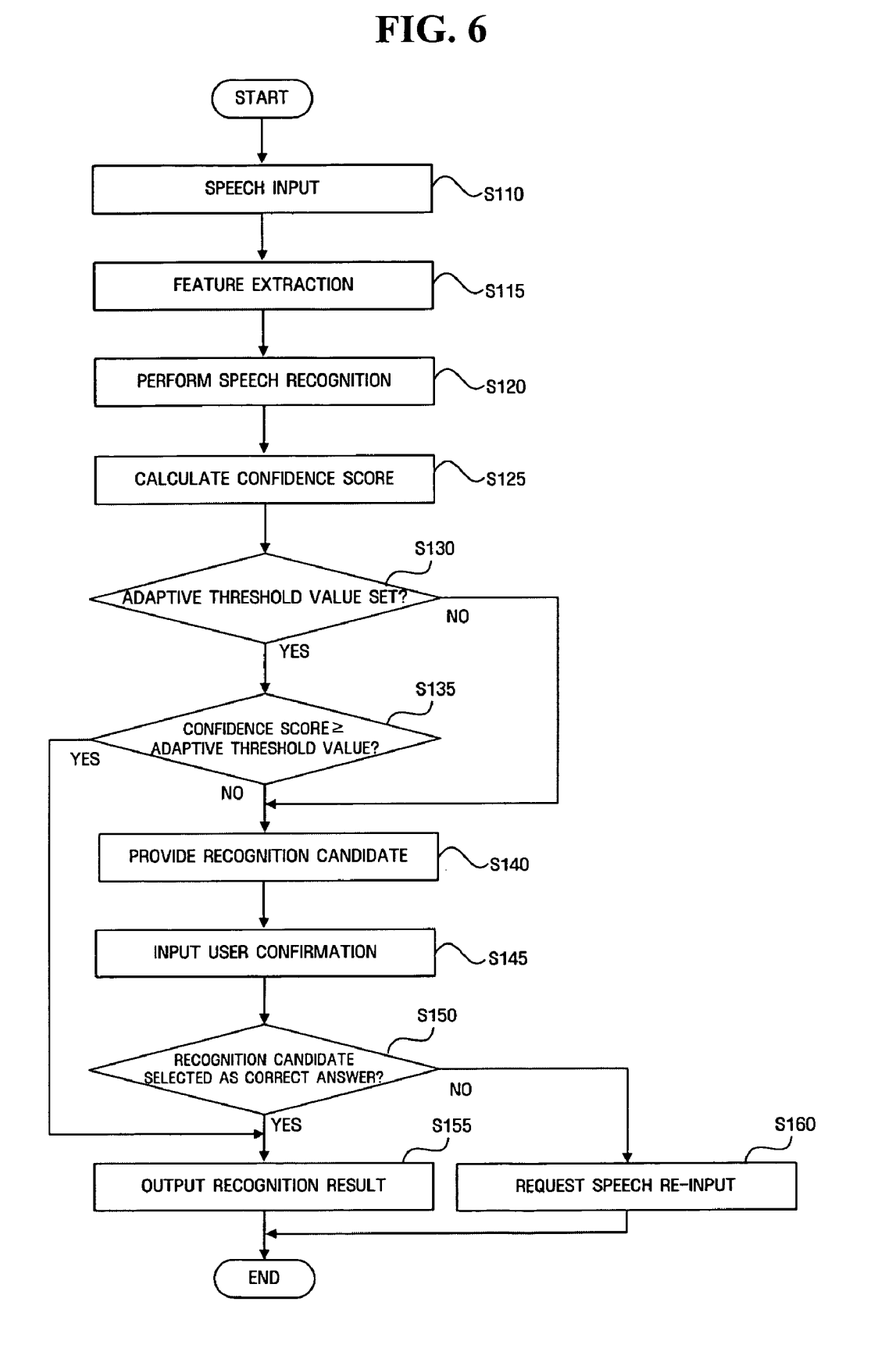
FIG. 6 is a flowchart illustrating a user adaptive speech recognition method according to an exemplary embodiment of the present invention.

FIG. 6 is a flowchart illustrating a user adaptive speech recognition method according to an exemplary embodiment of the present invention. The method is described with concurrent reference to FIG. 1 for enhanced clarity and ease of explanation.

If speech is input by a user S110, the feature extraction unit 110 extracts the speech features S115.

Then, the recognition unit 120 outputs the recognizable candidates S120 using the user input speech, and the confidence score calculation unit 130 calculates the confidence score of the outputted recognition candidate S125.

The control unit 150 decides whether the new threshold value has been set by the threshold value setup unit 140 S130.

If the new threshold value is set, the control unit 150 compares the confidence score calculated by the confidence score calculation unit 130 with the new threshold value S135.

If the confidence score is less than the threshold value, the control unit 150 provides the user with the recognition candidate S140. The recognition candidate can be visually provided to the user through a display unit 160, or it can be aurally provided to the user through the speech synthesis unit 170 and the speaker unit 180. If the confidence score is not less than the threshold value, the method proceeds to operation S155, discussed below.

For example, in the automobile navigation system having the speech recognition function, if a word "Seoul Station" is outputted from the recognition unit 120 as a recognition candidate as the result of performing speech recognition, the control unit 150 can display "Is Seoul Station Correct?" through the display unit 160. Also, the control unit 150 can control the speech synthesis unit 170 and the speaker unit 180 to respectively synthesize and output "Is Seoul Station Correct?"

Then, the control unit 150 receives the user confirmation with respect to the recognition candidate S145. The user confirmation can be input through a user input unit (not illustrated) such as a keypad or touch screen, or through the user speech. If the user confirmation is input via speech, the feature extraction unit 110 and the recognition unit 120 recognizes whether the user confirmation is positive or negative (i.e., whether the recognition candidate is accepted or rejected), and the result of recognition is transferred to the control unit 150.

At this instance, the control unit 150 decides whether the recognition candidate provided to the user is accepted by the user S150, and if the recognition candidate is accepted as the correct answer, it outputs the corresponding recognition candidate as the result of the speech recognition S155. For example, in an automobile navigation system, if the recognition candidate for a destination search is "Seoul Station," and it is selected as the correct answer, the control unit 150 outputs the word "Seoul Station" to a search application unit. The destination search application unit then searches for Seoul Station from map data, and provides the user with a drive path and the time required for driving from the present position to Seoul Station.

However, if the recognition candidate provided to the user is selected as an incorrect answer, the control unit 150 may inform the user of the failure of the speech recognition through the display unit 160, speech synthesis unit 170 and speaker unit 180, and ask the user to re-enter the speech S160.

On the other hand, if the confidence score is found to be higher than the new threshold value in the comparison of S135, the control unit 150 can output the corresponding recognition candidate as the result of the speech recognition without the user confirmation process S155.

The processes in S140 to S160 can be performed in the same manner even if the new threshold value is not set as the result of decision S130.

If the new threshold value is not set as the result of the decision in S130, the threshold value setup unit 140 sets the user adaptive new threshold value set through the user confirmation of the recognition candidate and the confidence score of each candidate. This will be explained in detail with reference to FIG. 7.

Figure 7:
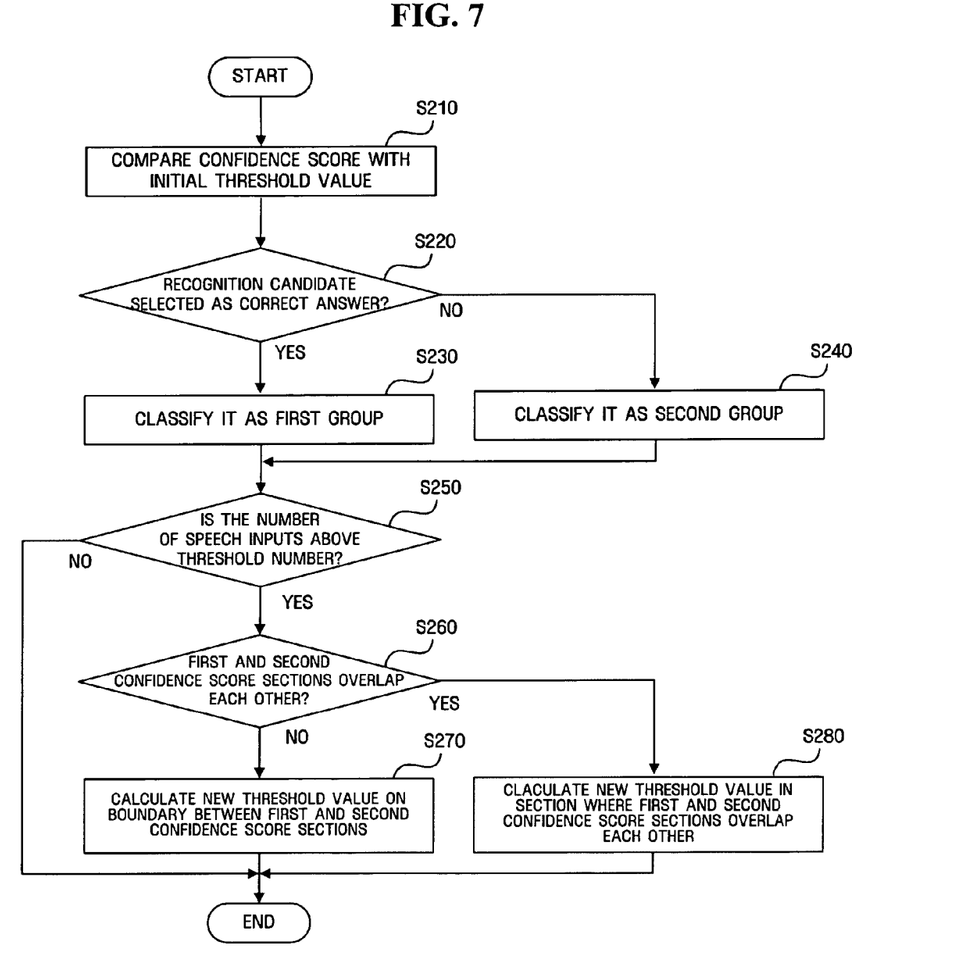
FIG. 7 is a flowchart illustrating a new threshold value setup process according to an exemplary embodiment of the present invention.

FIG. 7 is a flowchart illustrating a new threshold value setup process according to an exemplary embodiment of the present invention. The process is described with concurrent reference to FIGS. 1 and 6 for enhanced clarity and ease of explanation.

If a new threshold value is not set as the result of decision in S130 of FIG. 6, the decision unit 310 compares the confidence score of the recognition candidate with an initial threshold value S210. At this time, the decision unit 310 chooses a recognition candidate whose confidence score is higher than the initial threshold value as the correct answer, and decides that a recognition candidate whose confidence score is lower than the initial threshold value is an incorrect answer.

If the recognition candidate is selected as a correct answer by the user S220, the classification unit 320 classifies the corresponding recognition candidate into the first group S230. If the recognition candidate is selected as an incorrect answer by the user, the classification unit 320 classifies the corresponding recognition candidate into the second group S240. The recognition candidate classified by the classification unit 320 and the confidence score of the recognition candidate are stored in the storage unit 340.

If the number of speech inputs is greater than the threshold number of speech inputs S250, the threshold value calculation unit 330 calculates a new threshold value.

When calculating the threshold value, the threshold value calculation unit 330 decides whether the first and second confidence score sections overlap S260.

If the first and second confidence score sections do not overlap, the threshold value calculation unit 330 calculates the new threshold value that is on the boundary of the first and second confidence score sections S270. More specifically, the threshold value calculation unit 330 calculates the new threshold value that is lower than the lowest confidence score of the recognition candidate classified into the first group, and that is higher than the highest confidence score of the recognition candidate classified into the second group.

The threshold value calculation unit 330 may calculate the new threshold value as the average of the lowest confidence score of the recognition candidate classified into the first group and the highest confidence score of the recognition candidate classified into the second group.

However, if it is found that the first and second confidence score sections overlap in the decision of S260, the threshold value calculation unit 330 can calculate the new threshold value that exists in the overlapping region of the first and second confidence score sections. Specifically, the new threshold value calculated by the threshold value calculation unit 330 is higher than the lowest confidence score of the recognition candidate classified into the first group and is lower than the highest confidence score of the recognition candidate classified into the second group.

The new threshold value may be within a specified confidence score range. This confidence score range is set so that the ratio of the number of the recognition candidates having the confidence scores below a lower threshold value of the confidence score range among the recognition candidates classified into the first group to the number of the recognition candidates having the confidence scores above an upper threshold value of the confidence score range among the recognition candidates classified into the second group becomes the same as the threshold ratio. Further, the new threshold value may be an average value of the lowest confidence score of the recognition candidate that is higher than the upper threshold value of the confidence score range and the highest confidence score of the recognition candidate that is lower than the lower threshold value of the confidence score range.

It is contemplated that the present invention may be embodied as a computer-readable storage medium encoded with processing instructions for causing a processor to execute operations of at least the aforementioned method.

According to the user adaptive speech recognition method and apparatus of the above-described embodiments of the present invention, the user confirmation of the result of speech recognition can be reduced and the speech recognition success rate can be improved.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A user adaptive speech recognition method comprising:
calculating confidence scores of respective recognition candidates according to results of speech recognition of respective user input speech;
setting a new threshold value adapted to one or more users based on results of respective user confirmations by the one or more users of the respective recognition candidates according to a previous threshold value, wherein the setting of the new threshold value includes selectively setting the new threshold value so as to have a value according to a select range, selected from plural ranges differently defining respective ranges, based upon a determination indicating that a first confidence score of a first recognition candidate, that should be rejected, is greater than a confidence score of a second recognition candidate, that should be accepted, or a confidence score of a third recognition candidate, that should be accepted, is less than a confidence score of a fourth recognition candidate, that should be rejected; and outputting a corresponding recognition candidate as a result of the speech recognition when a calculated confidence score of the corresponding recognition candidate is determined to meet the new threshold value.

2. The method as claimed in claim 1, wherein the setting a new threshold value is performed when the number of speech inputs is greater than a threshold number of speech inputs.

3. The method as claimed in claim 1, wherein the new threshold value is set within the select range according to a predetermined threshold ratio, thereby controlling a permitted ratio of recognition candidates incorrectly accepted according to the new threshold value and recognition candidates incorrectly rejected according to the new threshold value.

4. The method as claimed in claim 1, wherein the differently defined ranges include at least a first range and a second range,
with the first range including values not greater than a lesser of a lowest confidence score of available recognition candidates incorrectly classified as being rejected and a lowest confidence score of recognition candidates correctly classified as being accepted and not less than a greater of a confidence score of available first recognition candidates incorrectly classified as being accepted and a greatest confidence score of recognition candidates correctly classified as being rejected, and
with the second range including values not greater than a greater of a greatest confidence score of the available recognition candidates incorrectly classified as being accepted and a confidence score of the recognition candidate correctly classified as being rejected, greater than a greatest confidence score of the available recognition candidates incorrectly classified as being rejected, and not less than a lesser of the lowest confidence score of the available recognition candidates incorrectly classified as being rejected and a confidence score of the recognition candidates correctly classified as being accepted, less than a lowest confidence score of the available recognition candidates incorrectly classified as being accepted.

5. A user adaptive speech recognition method comprising:
calculating a confidence score of a recognition candidate according to a result of speech recognition of speech input from a user;
setting a new threshold value adapted to the user based on a result of user confirmation of the recognition candidate and the confidence score of the recognition candidate; and
outputting a corresponding recognition candidate as the result of the speech recognition when the calculated confidence score is higher than the new threshold value, wherein the setting a new threshold value comprises:
classifying recognition candidates selected as correct answers by the user into a first group and classifying recognition candidates selected as incorrect answers by the user into a second group; and
calculating the new threshold value having a value in a range that is higher than the highest confidence score of the recognition candidates classified into the second group and that is lower than the lowest confidence score of the recognition candidates classified into the first group, when a first confidence score section being the confidence scores of the recognition candidates classified into the first group and a second confidence score section being the confidence scores of the recognition candidates classified into the second group do not overlap.

6. The method as claimed in claim 5, wherein the new threshold value is an average value of the lowest confidence score of the recognition candidates classified into the first group and the highest confidence score of the recognition candidates classified into the second group.

7. The method as claimed in claim 5, further comprising calculating the new threshold value so as to have a value in a range that is higher than the lowest confidence score of the recognition candidates classified into the first group and lower than the highest confidence score of the recognition candidates classified into the second group, when the first confidence score section and the second confidence score section overlap.

8. The method as claimed in claim 7, wherein the new threshold value is included in a specified confidence score range, and
wherein the confidence score range is set so that a ratio of a number of the recognition candidates having confidence scores below a lower threshold value of the confidence score range among the recognition candidates classified into the first group to a number of recognition candidates having the confidence scores above an upper threshold value of the confidence score range among the recognition candidates classified into the second group is the same as a threshold ratio.

9. The method as claimed in claim 8, wherein the new threshold value is an average value of the lowest confidence score of a recognition candidate that is higher than the upper threshold value of the confidence score range and the highest confidence score of a recognition candidate that is lower than the lower threshold value of the confidence score range.

10. A user adaptive speech recognition apparatus including at least one processing device, the apparatus comprising:
a confidence score calculation unit, using the at least one processing device, calculating confidence scores of respective recognition candidates according to results of speech recognition of respective user input speech;
a threshold value setup unit setting a new threshold value adapted to one or more users based on results of respective user confirmations by the one or more users of the respective recognition candidates according to a previous threshold value, wherein the setting of the new threshold value includes selectively setting the new threshold value so as to have a value according to a select range, selected from plural ranges differently defining respective ranges, based upon a determination indicating that a first confidence score of a first recognition candidate, that should be rejected, is greater than a confidence score of a second recognition candidate, that should be accepted, or a confidence score of a third recognition candidate, that should be accepted, is less than a confidence score of a fourth recognition candidate, that should be rejected; and
a control unit outputting a corresponding recognition candidate as a result of the speech recognition when a calculated confidence score of the corresponding recognition candidate is determined to meet the new threshold value.

11. The apparatus as claimed in claim 10, wherein the threshold value setup unit sets the new threshold value when the number of speech inputs is greater than a threshold number of speech inputs.

12. The apparatus as claimed in claim 10, wherein, wherein the new threshold value is set within the select range according to a predetermined threshold ratio, thereby controlling a permitted ratio of recognition candidates incorrectly accepted according to the new threshold value and recognition candidates incorrectly rejected according to the new threshold value.

13. A user adaptive speech recognition apparatus, including at least one processing device, the apparatus comprising:
   a confidence score calculation unit, using the at least one processing device, calculating a confidence score of a recognition candidate according to the result of speech recognition of speech input by a user;
   a threshold value setup unit setting a new threshold value adapted to the user based on a result of user confirmation of the recognition candidate and the confidence score of the recognition candidate; and
   a control unit outputting a corresponding recognition candidate as the result of the speech recognition when the calculated confidence score is higher than the new threshold value, wherein the threshold value setup unit comprises:
   a classification unit classifying recognition candidates selected as correct answers by the user into a first group and classifying recognition candidates selected as incorrect answers by the user into a second group; and
   a threshold value calculation unit calculating the new threshold value having a value in a range that is higher than the highest confidence score of the recognition candidates classified into the second group and that is lower than the lowest confidence score of the recognition candidates classified into the first group, when a first confidence score section being the confidence scores of the recognition candidates classified into the first group and a second confidence score section being the confidence scores of the recognition candidates classified into the second group do not overlap.

14. The apparatus as claimed in claim 13, wherein the new threshold value is an average value of the lowest confidence score of the recognition candidates classified into the first group and the highest confidence score of the recognition candidates classified into the second group.

15. The apparatus as claimed in claim 13, wherein the threshold value calculation unit calculates the new threshold value so as to have a value in a range that is higher than the lowest confidence score of the recognition candidates classified into the first group and that is lower than the highest confidence score of the recognition candidates classified into the second group, when the first confidence score section and the second confidence score section overlap.

16. The apparatus as claimed in claim 15, wherein the new threshold value is included in a specified confidence score range, and
   wherein the confidence score range is set so that a ratio of a number of the recognition candidates having confidence scores below a lower threshold value of the confidence score range among the recognition candidates classified into the first group to a number of recognition candidates having the confidence scores above an upper threshold value of a confidence score range among the recognition candidates classified into the second group is the same as a threshold ratio.

17. The apparatus as claimed in claim 16, wherein the new threshold value is an average value of the lowest confidence score of a recognition candidate that is higher than the upper threshold value of the confidence score range and the highest confidence score of a recognition candidate that is lower than the lower threshold value of the confidence score range.

18. A non-transitory computer-readable recording medium encoded with processing instructions for causing a processor to execute a user adaptive speech recognition method, the method comprising:
   calculating confidence scores of respective recognition candidates according to results of speech recognition of respective user input speech;
   setting a new threshold value adapted to one or more users based on results of respective user confirmations by the one or more users of the respective recognition candidates according to a previous threshold value, wherein the setting of the new threshold value includes selectively setting the new threshold value so as to have a value according to a select range, selected from plural ranges differently defining respective ranges, based upon a determination indicating that a first confidence score of a first recognition candidate, that should be rejected, is greater than a confidence score of a second recognition candidate, that should be accepted, or a confidence score of a third recognition candidate, that should be accepted, is less than a confidence score of a fourth recognition candidate, that should be rejected; and
   outputting a corresponding recognition candidate as a result of the speech recognition when a calculated confidence score of the corresponding recognition candidate is determined to meet the new threshold value.

19. The medium as claimed in claim 18, wherein the new threshold value is set within the select range according to a predetermined threshold ratio, thereby controlling a permitted ratio of recognition candidates incorrectly accepted according to the new threshold value and recognition candidates incorrectly rejected according to the new threshold value.

20. A method of setting a new threshold value adapted to a user of a speech recognition apparatus, the method comprising:
   determining whether a recognition candidate presented to the user is indicated by the user as correct;
   classifying, using at least one processing device, the recognition candidate based on a result of the determining, the recognition candidate being classified in a first group when the recognition candidate is correct, the recognition candidate being classified in a second group when the recognition candidate is incorrect;
   determining whether a range of probabilities of validity of the recognition candidates of the first group and a range of probabilities of validity of the recognition candidates of the second group overlap;
   calculating the new threshold value in a range between the range of the probabilities of validity of the recognition candidates of the first group and the range of the probabilities of validity of the recognition candidates of the second group, when the range of the first group and the range of the second group do not overlap; and
   calculating the new threshold value in a range where the range of the probabilities of validity of the recognition candidates of the first group and the range of the probabilities of validity of the recognition candidates of the second groups overlap, when the range of the first group and the range of the second group overlap.

21. A user adaptive speech recognition method comprising:

calculating confidence scores of respective recognition candidates according to results of speech recognition of respective user input speech;

setting a new threshold value adapted to one or more users based on results of respective user confirmations by the one or more users of the respective recognition candidates classified according to a previous threshold value, wherein the setting of the new threshold value includes selectively setting the new threshold value so as to have a value according to one of at least a first range and a second range, with the first range including values not greater than a lesser of a lowest confidence score of available recognition candidates incorrectly classified as being rejected and a lowest confidence score of recognition candidates correctly classified as being accepted and not less than a greater of a confidence score of available first recognition candidates incorrectly classified as being accepted and a greatest confidence score of recognition candidates correctly classified as being rejected, and with the second range including values not greater than a greater of a greatest confidence score of the available recognition candidates incorrectly classified as being accepted and a confidence score of the recognition candidate correctly classified as being rejected, greater than a greatest confidence score of the available recognition candidates incorrectly classified as being rejected, and not less than a lesser of the lowest confidence score of the available recognition candidates incorrectly classified as being rejected and a confidence score of the recognition candidates correctly classified as being accepted, less than a lowest confidence score of the available recognition candidates incorrectly classified as being accepted; and outputting a corresponding recognition candidate as a result of speech recognition when a calculated confidence score of the corresponding recognition candidate is determined to meet the new threshold value.

* * * * *

UNITED STATES PATENT AND TRADEMARK OFFICE
CERTIFICATE OF CORRECTION

PATENT NO. : 7,996,218 B2  
APPLICATION NO. : 11/354942  
DATED : August 9, 2011  
INVENTOR(S) : Jung-eun Kim et al.

Page 1 of 1

It is certified that error appears in the above-identified patent and that said Letters Patent is hereby corrected as shown below:

Column 13, Line 1, in Claim 12, after "claim 10," delete "wherein,".

Signed and Sealed this  
Fourteenth Day of February, 2012

David J. Kappos  
*Director of the United States Patent and Trademark Office*